Patented Oct. 29, 1929

1,733,720

UNITED STATES PATENT OFFICE

CARNIE B. CARTER, OF PITTSBURGH, PENNSYLVANIA, ASSIGNOR TO S. KARPEN & BROS., OF CHICAGO, ILLINOIS, A CORPORATION OF WEST VIRGINIA

MANUFACTURE OF ALCOHOL

No Drawing.   Application filed August 17, 1925.   Serial No. 50,834.

The present invention relates in general to the manufacture of alcohols from ethers by the action of acids on the ethers in the presence of water at elevated temperatures, and specifically to the manufacture of methyl alcohol from dimethyl ether.

The ethers are derived from alcohols by dehydration in accordance with the following equations, in which R and R' represent radicals such as methyl ($CH_3$), ethyl ($C_2H_5$), propyl ($C_3H_7$), etc.:

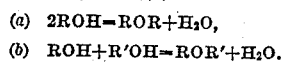

That is to say, two mols of alcohol condense, with the elimination of one mol of water, to produce one mol of ether. If two mols of the same alcohol condense in this manner, a normal ether is produced; if one mol each of two different alcohols condense, a mixed ether is produced. Thus, for example, two mols of methyl alcohol produce one mol of normal methyl ether ($CH_3OCH_3$), whereas one mol of methyl alcohol and one mol of ethyl alcohol produce one mol of methyl-ethyl ether ($CH_3OC_2H_5$). It is thus possible to produce three different ethers from a combination of any two alcohols. For example, the two alcohols ROH and R'OH give rise to two normal ethers, ROR and R'OR', and to one mixed ether R'OR.

Ethers are produced in several ways. They are produced for example, by acting upon alcohols with hot dehydrating agents such as concentrated sulphuric, phosphoric and benzene sulphonic acids; by the action of alkalies on halogenated hydrocarbons in alcoholic solution (see Carter and Coxe Patent 1,459,177, granted June 19, 1923); and they may be produced as by-products in certain chemical processes such, for example, as alkylation.

With the exception of normal ethyl ether which is used extensively as an anesthetic and solvent in the arts, the ethers are not widely used and are not, therefore, so valuable commercially as the alcohols from which they are derived. The present process enables the alcohols to be produced easily and economically from such ethers.

Generic equations have been given above to show how ethers are produced by the elimination of one mol of water from two mols of alcohol. These equations can be written in reversible form as follows:

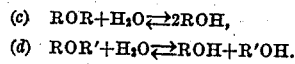

Under properly regulated conditions, it has been found that the ethers can be hydrated readily, even at ordinary pressures, in accordance with these equations. The process may be illustrated as follows:.

Twenty cc. of 75% aqueous sulphuric acid was treated at room temperature with methyl ether vapor until it contained 1.61 grams of ether in solution. This volume of 75% sulphuric acid is capable of holding 1.94 grams of methyl ether in solution at a temperature of 150° C. The solution contained in a sealed glass tube was heated for twenty minutes at 150° C., cooled to room temperature, diluted with a large volume of water and fractionally distilled until 25 cc. of aqueous condensate had been collected. The ether evolved during the distillation measured 178 cc. and weighed 0.336 gram; the amount of the ether reacting, therefore, was 1.28 grams equivalent to 2.22 cc. of methyl alcohol. Examination of the aqueous distillate showed the presence of 2.05 cc. of methyl alcohol. The yield was 92.5%. The fact that the recovery was not complete is not particularly significant; all of the ether actually consumed is recoverable as alcohol; the distillation was not sufficiently exhaustive to remove all alcohol from the reaction mixture.

In the foregoing experiment equilibrium was very closely approached, if indeed not actually attained, when about 80% of the ether used had reacted. It is thus evident that the reaction takes places rapidly in 75% sulphuric acid solution at a temperature of 150° C.

The experiment was conducted in a sealed glass tube. It is to be noted, however, that the volume of acid used was capable of holding more than 1.61 grams of ether in solution at 150° C. It follows, therefore, that pressures in excess of atmospheric pressure were not present and that the results represent effects that can be obtained by bubbling the ether vapor through 75% sulphuric acid maintained at a temperature of 150° C., and at atmospheric pressures. The sealed tube was merely used for purposes of accuracy.

It is to be noted that the reaction mixture was diluted with a large volume of water before subjecting it to distillation. This treatment was resorted to in order to be able to determine the relative amounts of attacked and unattacked ether at the equilibrium points. If the mixture had been distilled without previous dilution, the equilibrium would have been shifted towards the ether side of the equation due to the greater volatility of the ether and a true statement of the equilibrium condition would not have been obtained. The introduction of a large proportion of water arrested the reaction at the equilibrium point and thus permitted the attacked portion of the ether to be isolated as alcohol with considerable accuracy. The effectiveness of dilution in fixing the equilibrium products so that they can be isolated may be illustrated further as follows:

Forty to fifty cc. of 80% aqueous sulphuric acid were placed in a large test tube equipped with a special form of spiral scrubbing coil and heated to boiling over a free flame. Mehtyl ether vapor was forced through the boiling acid at a rate of 20 cc. per minute during a period of one hour. The vapors escaping from the test tube were led first through a condenser immersed in ice water and finally through a second condenser immersed in a mixture of carbon dioxide snow and alcohol. The first condenser collected water, alcohol and a small amount of ether and the second condenser the remainder of the ether vapor. During the experiment, 1200 cc. of ether vapor was used; of this amount 580 cc. escaped through the boiling acid and was recovered; 620 cc. equivalent to 1.5 grams of methyl alcohol was attacked. The aqueous condensate in the first condenser was found to contain 0.9 gram of methyl alcohol. The yield of alcohol as based on the amount of ether attacked was thus 60%; 40% of the attacked ether remained in the acid largely in the form of methyl acid sulphate. Of the 1200 cc. of ether vapor used about 52% was attacked and about 48% was unattacked. It is evident that the unattacked portion is recoverable for re-use and it is to be noted that the attacked portion remaining in the acid ultimately will be recovered as alcohol.

The experiment shows that if the acid is maintained at boiling, and that if water as such, or in the form of steam, is introduced continuously to compensate for water losses, ether vapor can be forced through the boiling acid continuously with the continuous production of an aqueous distillate rich in methyl alcohol. The ether will react rapidly; 50% or more of the ether, depending upon the rate of passage, efficiency of contact, etc., will be consumed to form alcohol, the remaining 50% or less being recoverable for re-use. It is thus evident the acid serves as a catalyst and that a given charge of acid is capable of converting an indefinite amount of ether into alcohol.

In the examples which have been given above, temperatures of 150° C. or even higher in the case of the example involving 80% acid were employed. The process may be operated, however, at lower temperatures, the time required for equilibrium to establish itself being correspondingly longer. A summary of three experiments using 75% aqueous sulphuric acid will make this clear. The experiments were conducted in essentially the same manner as the example first given above. Each experiment involved the use of several hermetically sealed glass tubes containing equal amounts of the same reaction mixture and the course of the reaction was followed by periodic analysis of the contents of these tubes until equilibrium had been established. Experiment ($a$) was conducted at 100° C.; ($b$), at 130° C.; and ($c$) at 150° C. The table below shows the time required at the several temperatures for equilibrium to be established.

Experiment ($a$) 4 hours.
Experiment ($b$) 30 minutes.
Experiment ($c$) 5 minutes.

It is thus evident that the reaction takes place with velocities of practical importance at temperatures as low as, or lower than, 100° C. For commercial purposes, it is improbable that temperatures much below 100° C. could be employed economically.

Although the process may be operated simply and economically at atmospheric pressures, it may also be operated to advantage under increased pressure. Thus, for example, in the first experiment given, if the ether is forced into the 75% aqueous sulphuric acid under sufficient pressure to maintain an ether content of 3.2 grams in 20 cc., instead of 1.61 grams, equilibrium will be attained at a temperature of 150° C. in 10 to 15 minutes when about 68% of the ether has been attacked. In the former case 1.28 grams of ether were attacked, whereas in this case 2.18 grams were attacked by the 20 cc. of acid used, the time required for equilibrium to be established being the same in both instances. The importance of increased pressure is evident; a given quantity of acid thus is capable of converting 70% more ether into alcohol in the same length of time owing to the increased pressure.

In the case of reversible reactions, such as the one under consideration; namely, $$ROR + H_2O \rightleftharpoons 2ROH,$$

it can usually be predicted just how the equilibrium will be affected by variations in the several components. It would be expected that for a given initial ether concentration, a decrease in the acid concentration and an increase in the water concentration would cause a greater amount of ether to be consumed at the equilibrium point owing to the mass action of the water. Thus it would be expected that for a given initial ether concentration, a 75% aqueous sulphuric acid solution would contain more ether at equilibrium than would a 40 or 50% aqueous sulphuric acid solution. Such is not the case. The following summary of four experiments will serve to show this fact.

In the accompanying table, column one shows the experiment number; column two, the acid concentration of the solution; column three, the percentage of the ether consumed at the equilibrium point; and column four, the time required for equilibrium to be established. The ether concentration initially in all cases was the same and the temperature was 150° C.

| Experiment | Acid concentration | Ether consumed | Time required |
|---|---|---|---|
|  | Per cent | Per cent |  |
| (d) | 40 | 43 | 40 minutes. |
| (e) | 50 | 62 | 30 minutes. |
| (f) | 75 | 92 | 10 minutes or less. |
| (g) | 95 | 98 | 5 minutes or less. |

Two noteworthy effects are shown by the table. First it is to be noted that for a given ether concentration, a solution containing 60% water and 40% acid reaches a state of equilibrium when only about 43% of the ether has been attacked; whereas, the same ether concentration in a solution containing 95% acid and 5% water reaches equilibrium when about 98% of the ether has been attacked. At intermediate acid concentrations, the values of 62% and 92%, respectively, were noted for ether consumption. Second, it is to be noted that the reaction velocity is very much higher in the higher acid concentrations; equilibrium is attained in the 95% acid in 5 minutes or less, whilst 40 minutes is required in the 40% acid solution. This seemingly anomalous behavior is to be explained on the basis of the following three reversible equations:

(e) $CH_3-O-CH_3+H_2SO_4 \rightleftarrows (CH_3)_2SO_4+H_2O$
(f) $(CH_3)_2SO_4+H_2O \rightleftarrows CH_3HSO_4+CH_3OH$
(g) $CH_3HSO_4+H_2O \rightleftarrows CH_3OH+H_2SO_4$ It follows from the results stated that the process can be successfully operated over a wide range of acid concentrations. It is entirely practicable to operate in acid concentrations even lower than 40%. The operation of the process at the lower acid concentrations, say at concentrations of 50% or less, however, will involve the use of pressures in excess of atmospheric pressure in order to enable the process to operate economically. The employment of pressure is necessary for two reasons: First, the solubility of the ether in the aqueous acid falls continuously with decreased acid concentration; second, the boiling point of the aqueous acid falls continuously with decreased acid concentration. Now in order to secure rapid reaction in the more dilute acid solutions, it is necessary to maintain high ether concentration and to employ temperatures as high as 150° C. or even higher. Pressure, therefore, is necessary to obtain both the high ether concentration and the high reaction temperature. These facts will be referred to later in discussing the preferred method of operation in the more dilute aqueous acid solutions.

Sulphuric acid has been employed in all discussions up to this point; other acids, such, for example, as phosphoric or benzene sulphonic acids may be used instead of sulphuric acid. Organic acids, such as formic acetic and oxalic acids, apparently are not capable of effecting the hydration, their lack of effectiveness being due in part at least to the fact that they form volatile esters. In like manner the halogen acids form volatile esters with the alcohol and, as a consequence of this ester formation when an equilibrium mixture containing such ester is subjected to distillation to remove alcohol formed in the hydrolysis, the ester is also removed with a consequent loss in acid from the solution. Thus, when hydrochloric acid is employed, the equilibrium mixture contains water, ether, alcohol, hydrochloric acid, and methyl chloride, which is volatile. When such a mixture is distilled to remove alcohol, methyl chloride is also removed along with ether and alcohol. Of course, such methyl chloride could be recovered along with the ether for re-use, but the practice of the process would be unnecessarily complicated thereby and the practice does not compare favorably with the use of an acid such as sulphuric acid which forms the easily hydrolyzed substantially non-volatile esters, dimethyl sulphate and methyl acid sulphate. The most suitable acids are the substantially non-volatile mineral acids which form easily hydrolyzable, high-boiling or substantially non-volatile esters.

The process is applicable to the hydration of ethers as a class of substances to produce the corresponding alcohols, such as ethyl, methyl, propyl, butyl, etc. As is known, the ethers are produced commercially as a class, by the action of hot concentrated sulphuric, phosphoric and benezene sulphonic acids.

The process which has been outlined can be operated practically in several different ways. The several methods of operation may conveniently be classified as follows:

Continuous operation ............ { At atmospheric pressures.
                                  { At increased pressures.
Discontinuous operation ......... { At atmospheric pressures.
                                  { At increased pressures.

When operated at asmospheric pressures, the process will of necessity involve the use of acids of higher concentrations than is necessary for operation under increased pressures, regardless of whether continuous or discontinuous operation is employed. This, as has already been pointed out, is due to the fact that in order to secure high ether concentration and rapid reaction at atmospheric pressures, it is necessary to employ an aqueous acid solution which boils at temperatures in the neighborhood of 150° C. and which at the same time is capable of dissolving large volumes of ether at these elevated temperatures. Acid concentrations of the order of 60 to 80% sulphuric acid and 40 to 20% water are suitable for the purpose. It is to be emphasized, however, that even at these relatively high acid concentrations, pressure can be used to advantage, since, as has been noted earlier, the increased pressure enables a given quantity of acid to convert a greater quantity of ether into alcohol in a given interval of time than is possible at asmospheric pressure.

When operated at increased pressure, the process may use much smaller acid concentrations than those given above. An acid concentration of 40% or less may be used advantageously. It is necessary when using acid concentrations of this order to employ increased pressure to compensate for the fact that the reaction velocity for a given ether concentration is less in the lower acid concentration. The increased pressure can bring about higher ether concentration and it also permits of higher operating temperatures.

The continuous process may be carried out in the following general manner. The ether in the vaporous state, together with suitable amounts of steam, is forced through boiling acid in any suitable form of apparatus, the vapors escaping from such boiling acid, containing unattacked ether, water and alcohol, being collected and fractionally distilled to recover the alcohol and ether, the alcohol going into storage and the ether returning to the system for re-use. The acid for the purpose may be contained in any suitable vessel of glass, chemical stoneware, silica, enameled metal or acid-resisting metal equipped with stirrers, baffles, or other suitable forms of agitators to effect intimate contact between acid and vapors, or the acid may be caused to flow over fragments of silica, glass, coke, stoneware, etc., in any suitably heated tower in a stream countercurrent to the incoming vapors. The temperature is maintained substantially constant at the boiling point of the particular acid concentration which is in use; thus, if the acid in use is 75% sulphuric acid, the temperature is regulated at or very near the boiling point of 75% sulphuric acid. The stream of ether vapor and steam passing through the boiling acid reacts in part with the acid, and a portion of the ether is consumed to form alcohol which is evolved with the steam and unattacked ether. These escaping vapors pass through suitable condensors where the alcohol and water are separated from the ether vapor, which is returned to the boiling acid together with steam and the cycle is repeated. The aqueous alcohol is subjected to fractional distillation to remove water.

It will be evident from the foregoing description that the process can be carried out continuously, ether and water being added to the system continuously, and water and alcohol being continuously withdrawn. The acid concentration will remain constant if the temperature is maintained constant since the water is added to the system as fast as it is withdrawn.

In the description above, water is added in the form of steam and ether is introduced in the vaporous state. It is not essential that these materials shall be added in this way; it is entirely practicable to add the water in the liquid condition whilst in the case of methyl ether, which boils at about −23° C., it probably is desirable to introduce it in the vaporous state. Ethers of higher boiling point might advantageously be added in the liquid condition.

It follows from results which have been given and from statements which have been made that the process as outlined above can be operated over a wide range of acid concentrations. The more practicable limits are from 40% to 80%. Acid concentrations higher than 80% to 85% probably are not desirable since excessive amounts of acid may be destroyed due to side reactions; on the other hand, the lower limits of acid concentrations are determined very largely by pressure considerations, and it is preferred to avoid very high pressures. Since, however, it is practicable to operate the process easily at atmospheric pressure in acid of 60 to 80% concentration, and at moderately elevated pressures in 40 to 50% acid, it is not advisable to use lower acid concentrations.

In the intermittent or discontinuous process, the ether is led into the acid contained in a suitable vessel until the acid is saturated with the ether or until the desired amount of ether has been added. Heating is performed at a suitable temperature until a state of equilibrium in the reacting mixture has been substantially attained, after which the mixture is distilled either with, or without, previous addition of water to recover alcohol resulting from the reaction, the ether being recovered for re-use.

In the practice of the discontinuous process, the procedure may be varied depending upon whether the more dilute or the more concentrated acid is employed. If an acid concentration of say 40 to 50% is used, an autoclave, or digester, may be employed conveniently. The autoclave is partially filled with the aqueous acid, and the ether is pumped in, either in the vaporous or liquid state until the desired amount of ether has been added; the temperature is raised to a temperature of say 150° C. and maintained at this point until a state of equilibrium is attained; the temperature then may be lowered to the boiling point of the reaction mixture which is subjected to fractional distillation to remove and separate the ether and alcohol from the aqueous acid. Water is added to the acid remaining in the autoclave, or digester, to bring it back to its original strength, more ether is added, and the operation is repeated.

The ether concentration may be varied over wide limits in the process. Concentrations of 10% to 20% or even more are practicable; other things being equal, the higher the ether concentration, the more alcohol is produced by a given weight of acid. Ten to twenty per cent of ether on the weight of the acid is a good working proportion.

Temperature, also, may be varied over rather wide limits. A temperature of 150° C. is entirely satisfactory for acid concentrations of 40% to 50%. Equilibrium will be established in acids of this concentration within thirty minutes to one hour at 150° C. At lower temperatures, the time required for equilibrium to be attained will be longer; at higher temperatures, the time will be considerably shorter.

The pressures involved in the operation of the process as outlined above will vary widely depending upon the procedure employed. With a given ether concentration, the pressure will be greater the lower the acid concentration, other things being equal, owing to the fact that the ether is more soluble in the acid of higher concentrations. Also, for a given ether concentration, the pressure will be much higher for a working temperature of 150° C. than for a working temperature of 130° C., or less. Thus, it will appear that the pressure is an exceedingly variable factor.

It is probably imperative that the discontinuous process shall be operated at increased pressure when acid concentrations of 40%, or less, are employed. At the higher concentration, such as 60% to 80%, however, it is practicable to operate either at atmospheric or increased pressures, the increased pressure when employed serving to cause a larger transformation of ether into alcohol per unit of acid in unit time than would otherwise be possible. In operating the process at atmospheric pressure, the aqueous acid, preferably of about 75% strength, is heated to a temperature just short of its boiling point, and ether is introduced until it is substantially saturated. Water in the desired amount is then added and the reaction mixture is subjected to rapid distillation until water is removed and the acid brought back to its initial value. During the distillation, water, alcohol and ether are evolved. These are passed through suitable condensers and stills to effect separation of the alcohol from the ether and water, the ether being recovered for further use.

The several methods of practicing the process which have been given are typical; others might be described, but it is believed that these are sufficient to illustrate the principles involved.

The foregoing detailed description has been given for clearness of understanding only, and not unnecessary limitations should be understood therefrom, but the appended claims should be construed as broadly as permissible in view of the prior art.

What I regard as new, and desire to secure by Letters Patent is:

1. The process of producing alcohol which consists in causing a reaction under the influence of heat between ether and an aqueous acid of more than 40% strength, said acid being of non-volatile-ester forming character.

2. The process stated in claim 1 characterized by the use of aqueous sulphuric acid of more than 40% strength in effecting hydration of the ether.

3. The process stated in claim 1 characterized by the use of aqueous sulphuric acid of a concentration not less than approximately 40% or greater than approximately 85% to effect hydration of the ether.

4. The process stated in claim 1 characterized by carrying on the reaction at a temperature in excess of 100° C. and under a pressure in excess of atmospheric pressure.

5. The process of claim 1, characterized by carrying out the process as a continuous operation, collecting the vapors containing alcohol, water and unattacked ether, fractionally distilling to recover the alcohol and ether, and introducing water and ether into the system as required to continue the reaction.

6. The process stated in claim 1, characterized by employing an acid concentration not in excess of seventy-five per cent and not lower than 40%, a high ether concentration, and carrying on the reaction under pressure and at a temperature above 100° C.

7. The process of producing alcohol which comprises applying heat to a mixture of ether and aqueous sulphuric acid of a concentration of not less than approximately 40% and not greater than approximately 85% and evolving vapors therefrom, fractionally condensing the alcohol and ether vapors evolved, and introducing fresh supplies of either and water into the mixture.

8. In a process of hydrating ether to form alcohol, the steps which comprise supplying water and ether to a boiling mixture containing aqueous sulphuric acid, and fractionally condensing the vapors evolved, the water introduced being sufficient to maintain the concentration of acid with respect to water at not less than approximately 40% or greater than approximately 85% during the hydrating period.

9. The process of producing alcohol which consists in causing a reaction under the influence of heat at a temperature exceeding 100° C. between ether and aqueous sulphuric acid of more than 60% and not exceeding 90% strength, the ether present in the reaction mixture being within the limits of 10 to 20% of the weight of the acid.

CARNIE B. CARTER.